United States Patent
Loeschner et al.

(10) Patent No.: US 8,222,759 B2
(45) Date of Patent: Jul. 17, 2012

(54) ROTOR BEARING FOR A WIND TURBINE

(75) Inventors: Tim Loeschner, Wuerzburg (DE);
Rudolf Zeidlhack, Werneck-Essleben (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 183 days.

(21) Appl. No.: 12/675,644

(22) PCT Filed: Jul. 24, 2008

(86) PCT No.: PCT/DE2008/001236
§ 371 (c)(1), (2), (4) Date: Apr. 19, 2010

(87) PCT Pub. No.: WO2009/030189
PCT Pub. Date: Mar. 12, 2009

(65) Prior Publication Data
US 2010/0244454 A1  Sep. 30, 2010

(30) Foreign Application Priority Data
Aug. 31, 2007 (DE) .......... 10 2007 041 508

(51) Int. Cl.
*F03D 9/00* (2006.01)
(52) U.S. Cl. .......... 290/44; 290/55
(58) Field of Classification Search .......... 290/44, 290/55
See application file for complete search history.

(56) References Cited

U.S. PATENT DOCUMENTS

| | | | |
|---|---|---|---|
| 5,852,947 A | 12/1998 | Tsujimoto et al. | |
| 6,176,804 B1 * | 1/2001 | Kekki et al. | 290/55 |
| 6,872,049 B2 * | 3/2005 | Christensen | 415/124.1 |
| 7,935,020 B2 * | 5/2011 | Jansen et al. | 475/338 |
| 2004/0213671 A1 | 10/2004 | Flamang | |

FOREIGN PATENT DOCUMENTS

| | | |
|---|---|---|
| EP | 1431575 | 6/2004 |
| EP | 1705392 A1 | 9/2006 |
| EP | 1717489 | 11/2006 |

(Continued)

OTHER PUBLICATIONS

SKF Publication entitled: "The SKF slewing bearing cuts its way 40 metres under the sea bed" published in 1990.

*Primary Examiner* — Tho D Ta
(74) *Attorney, Agent, or Firm* — Lucas & Mercanti, LLP; Klaus P. Stoffel

(57) ABSTRACT

A rotor bearing for a wind turbine with a machine housing rotatably received on a tower. The housing has a generator, a wind-driven rotor with a rotor hub carrying rotor blades and a large rolling bearing carrying the rotor. The large rolling bearing has a first bearing ring, which is non-rotatably fastened on the housing and arranged coaxially to the rotor hub, and a second hearing ring, which is rotatably held on the first bearing ring and fastened to the rotor hub, and rolling elements rolling between the bearing rings. The large rolling bearing is connected to a planetary gear which is connected to the generator and has a ring gear with a peripheral internal gear, planet gears received on planet carriers and a central sun gear. The radially inner bearing ring is also the ring gear connected to the generator, its interior being configured with the peripheral internal gear.

11 Claims, 4 Drawing Sheets

FOREIGN PATENT DOCUMENTS

| | | |
|---|---|---|
| GB | 875194 A | 8/1961 |
| WO | 02/14690 A1 | 2/2002 |
| WO | 03/014567 A1 | 2/2003 |
| WO | 03/031812 A1 | 4/2003 |
| WO | 03031812 | 4/2003 |
| WO | 2005050059 | 6/2005 |
| WO | 2006053940 | 5/2006 |
| WO | 2008113318 | 9/2008 |

* cited by examiner

ROTOR BEARING FOR A WIND TURBINE

This application is a 371 of PCT/DE2008/001236 filed Jul. 24, 2008, which in turn claims the priority of DE 10 2007 041 508.9 filed Aug. 31, 2007, the priority of both applications is hereby claimed and both applications are incorporated by reference herein.

FIELD OF THE INVENTION

The invention relates to a rotor bearing for a wind energy installation as claimed in the features of patent claim 1 which form the precharacterizing clause, and it can be implemented particularly advantageously on wind energy installations having a rotor, which is mounted on a main bearing, and a downstream epicyclic gearbox.

BACKGROUND TO THE INVENTION

A wind energy installation such as this is already known in a generic form, for example, from WO 03/014 567 A1 or from U.S. Pat. No. 6,872,049 B2. The wind energy installations disclosed in these documents essentially each comprise a machine housing which is mounted on a machine tower such that it can rotate, having a generator for electricity production, having a wind-driven rotor with a rotor hub to which at least two rotor blades are fitted, and having a large roller bearing, which supports the rotor. In this case, the large roller bearing is generally in the form of a two-row conical roller bearing and has a first bearing ring, which is attached in a rotationally fixed manner to the machine housing and is arranged coaxially with respect to the rotor hub, as well as a second bearing ring, which is held on the first bearing ring such that it can rotate and is attached to the rotor hub, and having a multiplicity of roller bodies which roll between the bearing rings. Furthermore, the large roller bearing is connected to an epicyclic gearbox, which is connected to the generator in the machine housing and comprises, in a known manner, a hollow wheel with a circumferential internal tooth system, a plurality of planet wheels mounted on planet supports, and a central sun wheel, in which the inner of the two bearing rings of the large roller bearing is mounted by means of a push fit on the outer casing surface of the hollow wheel of the epicyclic gearbox.

Furthermore, EP 811 764 A1 also discloses the large roller bearing being connected to the epicyclic gearbox such that the inner of the two bearing rings of the large roller bearing is pressed against a ring which is connected to the rotor hub and is fitted with the planet supports.

However, rotor bearings such as these have the disadvantage that the large roller bearing and the downstream epicyclic gearbox comprise a relatively large number of individual parts and are therefore on the one hand highly costly to manufacture, while on the other hand having a high total weight, which has a highly disadvantageous effect when they are being installed in the machine housing at a height of up to 120 m. Furthermore, both the hollow wheel of the epicyclic gearbox and the inner bearing ring of the large roller bearing, which generally have an external or internal diameter of more than 2.00 m, must be manufactured extremely precisely, despite their size, in order to make it possible to reliably preclude the negative influences, which result from a positive excess fit size and from an excessively tight fit in the push connection between the inner bearing ring and the hollow wheel, on the function of the bearing point or on the tooth system of the epicyclic gearbox. By way of example, an excessively tight fit such as this can on the one hand lead to the inner bearing ring of the large roller bearing widening slightly when it is being mounted on the hollow wheel, and in the radial play which is set in the large roller bearing being too small, thus excessively increasing the friction between the roller bodies and their raceways in the bearing rings. This would result in the maximum permissible operating temperature of the large roller bearing being exceeded, to partial combustion of the lubricant and thus to a lack of lubrication in the large roller bearing, with the large roller bearing in the end failing prematurely. On the other hand, it is also possible for the excessively tight fit between the inner bearing ring of the large roller bearing and the hollow wheel of the epicyclic gearbox to lead to a slight constriction of the hollow wheel, as a result of which the contact points between the internal tooth system on the hollow wheel and the tooth systems on the planet wheels of the epicyclic gearbox changing, with the result that force is no longer transmitted in a defined manner within the epicyclic gearbox, in the worst case leading to teeth breaking on one of the tooth systems.

OBJECT OF THE INVENTION

Against the background of the described disadvantages of the solutions in the known prior art, the invention is therefore based on the object of designing a rotor bearing for a wind energy installation which is compact, weighs less and is distinguished by a smaller number of individual parts on the large roller bearing and in the downstream epicyclic gearbox, and in which the negative influences, which occur as a result of a positive excess fit size in the push fit between the inner bearing ring of the large roller bearing and the hollow wheel of the epicyclic gearbox, on the function of the bearing point or on the tooth system of the epicyclic gearbox are reliably precluded.

DESCRIPTION OF THE INVENTION

According to the invention, this object is achieved for a rotor bearing according to the preamble of claim 1 in such a way that the radially inner of the two bearing rings of the large roller bearing at the same time forms the hollow wheel of the epicyclic gearbox which is connected to the generator, in that its inner face is formed with the circumferential internal tooth system of the hollow wheel.

The invention is therefore based on the realization that the stated object can be achieved in a simple manner in that, instead of having a complex push fit between the hollow wheel of the epicyclic gearbox and the inner bearing ring of the large roller body, both annular components are formed by integration with one another simply by a single less costly and lighter-weight component, in which negative fit influences on the bearing point or on the tooth system of the epicyclic gearbox for the cannot occur in the first place.

Preferred refinements and developments of the rotor bearing according to the invention are described in the dependent claims.

Accordingly, for the rotor bearing according to the invention, claim 2 provides that in a first embodiment the large roller bearing is preferably in the form of a conical roller bearing having two rows which are arranged alongside one another and have conical rollers as roller bodies, the inner bearing ring, which has the internal tooth system, is separated axially asymmetrically into two ring elements.

However, according to claim 3, it is alternatively also possible that in a second embodiment the large roller bearing is preferably formed from an inclined ball bearing having two rows which are arranged alongside one another and have bearing balls as roller bodies, the inner bearing ring, which has the internal tooth system, is separated axially asymmetrically into two ring elements.

Designing the large roller bearing as a two-row conical roller bearing in this case represents the preferred practical embodiment since this type of bearing fundamentally has higher load ratings and a higher power density. However, if the intention is to use large roller bearings with larger diameters, in which the power density no longer represents the critical criterion, a technically quite acceptable alternative is to be also designed in the form of a two-row inclined ball bearing. In this case, the two types of bearing, both for the inner bearing ring and for the outer bearing ring, can either be attached in a rotationally fixed manner to the machine housing or to the machine support, or else can be connected to the rotor hub of the rotor, in which case the axially asymmetric separation of the inner bearing ring of both embodiments into two ring elements is necessarily primarily to allow the large roller bearing to be installed more easily.

Independently of the previously described embodiments, a further feature of the rotor bearing according to the invention, as claimed in claim 4, is that, as a result of the asymmetric subdivision, the inner bearing ring comprises a first ring element, which has the complete internal tooth system on its inner face, and a second ring element, which is mounted on this ring element by a push fit. The asymmetric subdivision of the inner bearing ring therefore has the advantage, at the same time that the large roller bearing can be installed more easily, that the internal tooth system can be incorporated entirely in one of the ring elements, and can therefore be produced at a lower cost. In this case, it has been found to be particularly advantageous for the second ring element to completely form one of the two raceways for the roller bodies of the large roller bearing, although other asymmetric subdivisions of the inner bearing ring are also feasible.

Against the background of the features described above, the rotor bearing according to the invention and as claimed in claim 5, is furthermore also distinguished in that the internal tooth system on the inner face of the first ring element of the inner bearing ring is optionally in the form of a continuous straight or inclined tooth system, or a double-inclined or arrow tooth system, in each case running parallel to one another in an axially central separating groove.

In this case, it is in fact a conventional option for the internal tooth system to be in the form of a straight tooth system, which was used in particular before the identification of the noise and sound emissions produced thereby. Nevertheless, a straight tooth system such as this is of interest, as before, because of its low manufacturing costs, in particular when used in combination with modern silencing measures.

However, more recent gearbox concepts generally provide an oblique tooth system for all the wheels in the epicyclic gearbox, since this tooth system makes it possible to choose an inclination angle which results in a considerably greater coverage level in the tooth system in comparison to a straight tooth system, thus considerably reducing vibration and noise during wind operation. Furthermore, the tooth system can be designed to have up to twice the tooth length of a straight tooth system, thus allowing considerably greater torque to be transmitted while occupying the same amount of physical space. In addition, the oblique tooth system offers the capability to compensate for external axial forces in that the inclination direction of the tooth system is designed to correspond to the direction of the externally acting axial forces.

However, by far the greatest advantages are offered by an epicyclic gearbox in which both the hollow wheel and the planet wheels as well as the sun wheel have a double-inclined or arrow tooth system. The special feature of such a double-inclined or arrow tooth system is in this case the high coverage level of the tooth system, which allows quiet, low-vibration operation of the epicyclic gearbox. The two-directional axial forces, which result from the oblique tooth systems in opposite directions, are in this case directed such that they cancel one another out, thus ensuring optimum load transmission. Furthermore, a double-inclined or arrow tooth system has the particular advantage that the axially moving bearing of the planet wheels compensates for any alignment errors between the two tooth-system areas which result on the inner bearing ring when manufacturing the tooth systems, since the planet wheels are automatically centered by the tooth-system profile.

One expedient development of the rotor bearing according to the invention is, according to claim 6, furthermore that a spacer ring is preferably arranged with a determined defined width between the two ring elements of the inner bearing ring, in order to make it possible to adjust the axial play of the large roller bearing. In this case, the spacer ring preferably has the same internal diameter as the second ring element of the inner bearing ring, and is likewise pushed onto the first ring element before the second ring element.

As a further possible way to adjust the axial play of the large roller bearing of the rotor bearing according to the invention, claim 7 finally proposes that also the outer bearing ring is additionally separated into two ring elements, but axially symmetrically, between which ring elements a spacer ring is arranged which has a determined defined width. In this case, it is particularly advantageous for the spacer ring between the ring elements of the outer bearing ring to have the same radial height as the ring elements, although it is also possible for the spacer ring to be arranged in an annular groove, which is incorporated in those axial surfaces of the two ring elements which rest against one another, such that the ring elements are at a short distance from one another, and/or have an additional interlocking connection to one another.

Another suitable measure for adjusting the axial play of the large roller bearing in the form of a conical roller bearing or inclined ball bearing would also, as an alternative, be to at least provide the second ring element of the inner bearing ring with a defined width by grinding its axial side facing the first ring element. However, it would also be feasible to appropriately machine the mutually facing axial sides of both ring elements or to influence their axial size by coatings. Since processing such as this is relatively complex and costly from the manufacturing point of view, however, the use of a spacer ring for axial play adjustment has been found to be most advantageous both for cost reasons and for the reason that this also makes it possible to compensate relatively easily for any processing errors in the width of the spacer ring, by replacement by a fitting spacer ring.

In summary, the rotor bearing according to the invention therefore has the advantage over rotor bearings known from the prior art that the large rotor bearing, as before, can absorb all the forces and torques acting on the rotor while, at the same time, carrying out the function of this hollow wheel by means of the tooth system of the hollow wheel of the downstream epicyclic gearbox being integrated in the inner bearing ring. The rotor bearing according to the invention is therefore compact and weighs less, and is distinguished by a smaller number of individual parts on the large roller bearing and on the epicyclic gearbox. Furthermore, the integral nature of the inner bearing ring and hollow wheel means that the negative influences which previously occurred because of the positive excessive fit size in the push fit between the inner bearing ring and the hollow wheel on the function of the bearing point or on the tooth system in the epicyclic gearbox, are reliably precluded.

BRIEF DESCRIPTION OF THE DRAWINGS

The rotor bearing according to the invention will be explained in more detail in the following text using a plurality of preferred embodiments and with reference to the attached drawings, in which.

DETAILED DESCRIPTION OF THE DRAWINGS

Figure 1:
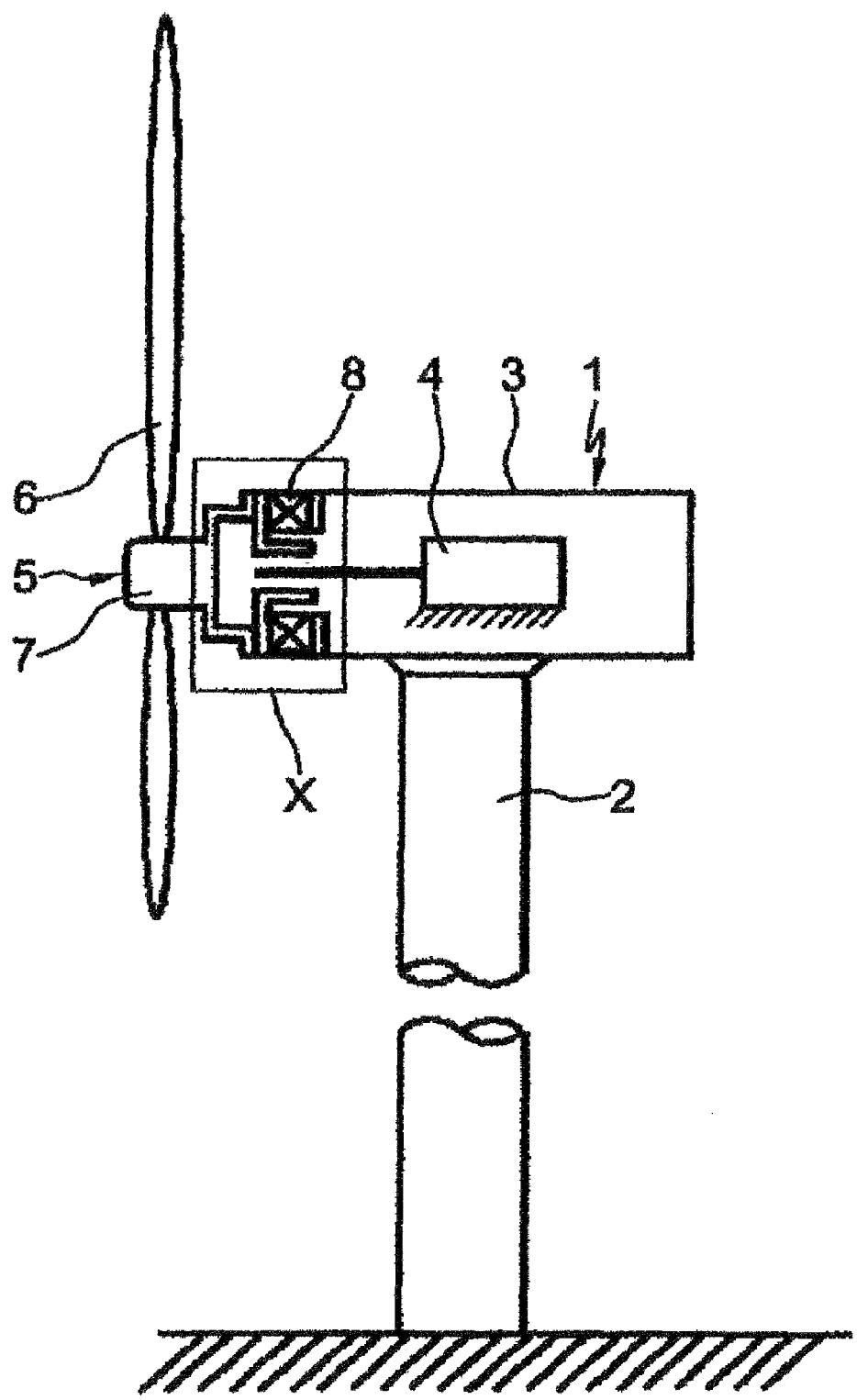
FIG. 1 shows a schematic illustration of a wind energy installation having a rotor bearing according to the invention.
Figure 2:
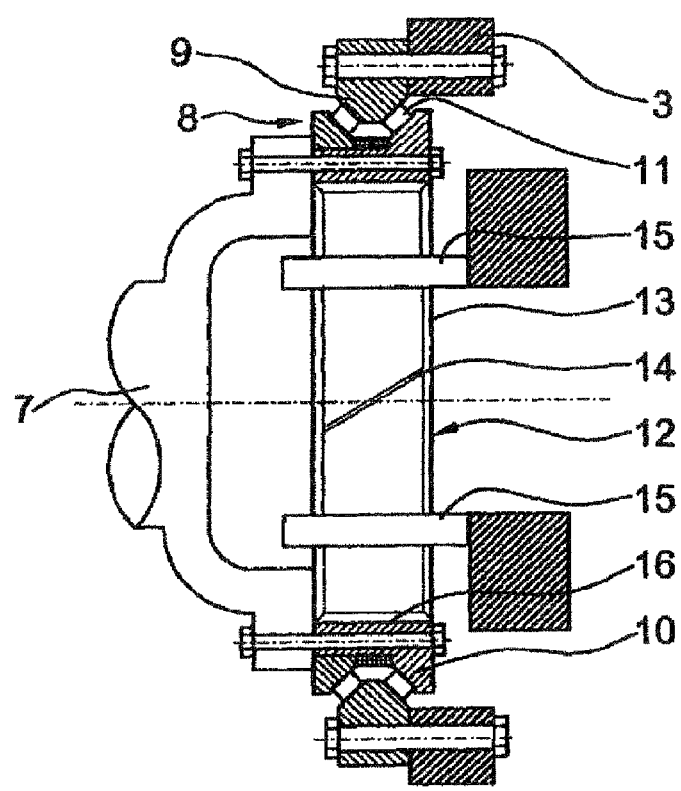
FIG. 2 shows an enlarged illustration of the detail X as shown in FIG. 1, with a first variant of the rotor hub/large roller bearing attachment of the rotor bearing according to the invention.
Figure 3:
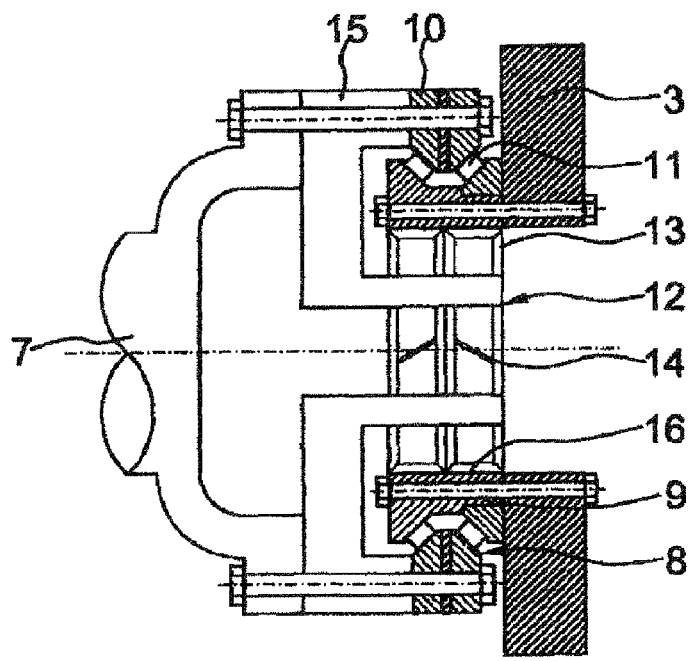
FIG. 3 shows an enlarged illustration of the detail X as shown in FIG. 1 with a second variant of the rotor hub/large roller bearing attachment of the rotor bearing according to the invention.

FIG. 1 schematically illustrates a wind energy installation 1 which essentially comprises a machine housing 3, which is mounted on a machine tower 2 such that it can rotate, having a generator 4 for electricity production and having a wind-driven rotor 5 with a rotor hub 7, which is fitted with at least two rotor blades 6, and a large roller bearing 8, which supports the rotor 5. In this case, as shown in FIGS. 2 and 3, the large roller bearing 8 has a first bearing ring 9, which is attached in a rotationally fixed manner to the machine housing 3 and is arranged coaxially with respect to the rotor hub 7, as well as a second bearing ring 10, which is held on the first bearing ring 9 such that it can rotate and is attached to the rotor hub 7, wherein the first bearing ring 9, which is connected to the machine housing 3, is formed either, as in the case of the first variant illustrated in FIG. 2, by the outer ring, or as in the case of the second variant illustrated in FIG. 3, by the inner ring of the large roller bearing 8, and the second bearing ring 10, which is attached to the rotor 5, is accordingly likewise either in the form of an inner ring or an outer ring. As can likewise be seen from FIGS. 2 and 3, the large roller bearing 1 has a multiplicity of roller bodies 11 which roll between the bearing rings 9, 10, and has a downstream epicyclic gearbox 12 which is connected to the generator 4 and, in a known manner, comprises a hollow wheel 13 with a circumferential internal tooth system 14, a plurality of planet wheels mounted on planet supports 15, which is not illustrated in any more detail and a central sun wheel which is likewise not illustrated in any more detail.

Figure 4:
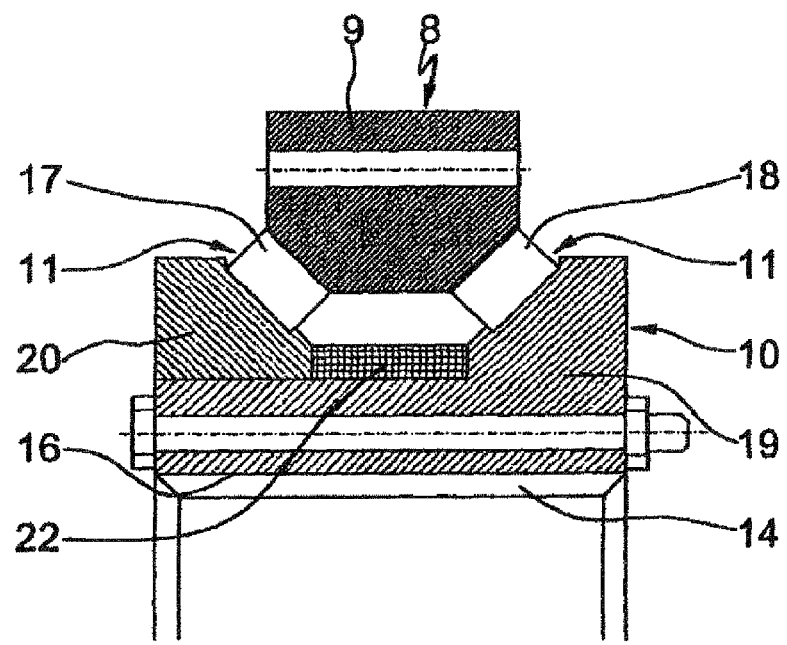
FIG. 4 shows a partial view of a cross section through a first embodiment of the large roller bearing of the rotor bearing according to the invention.
Figure 5:
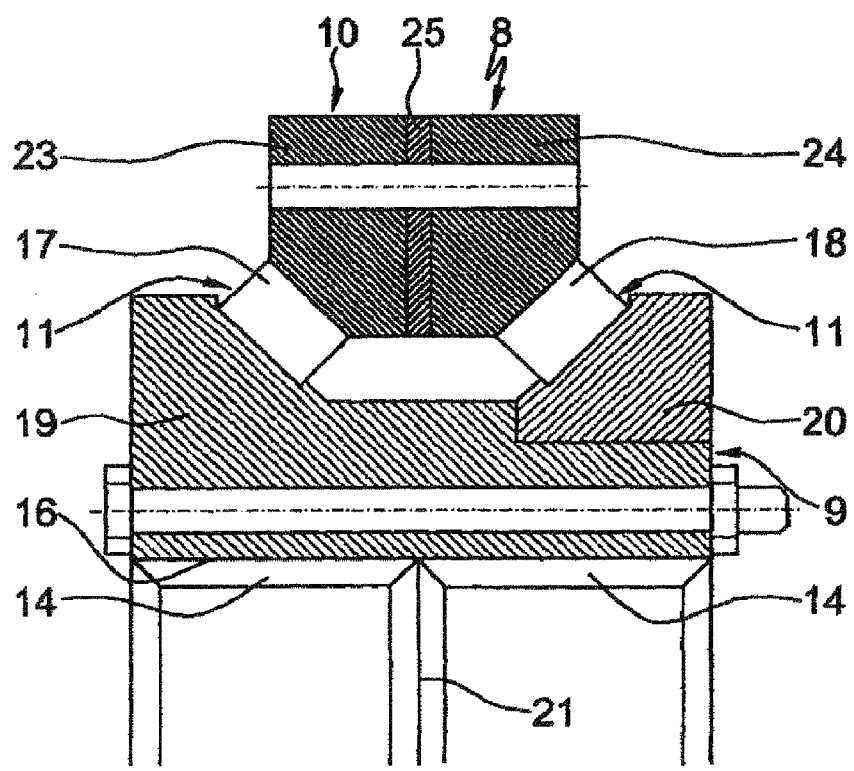
FIG. 5 shows a partial view of a cross section through a second embodiment of the large roller bearing of the rotor bearing according to the invention.
Figure 6:
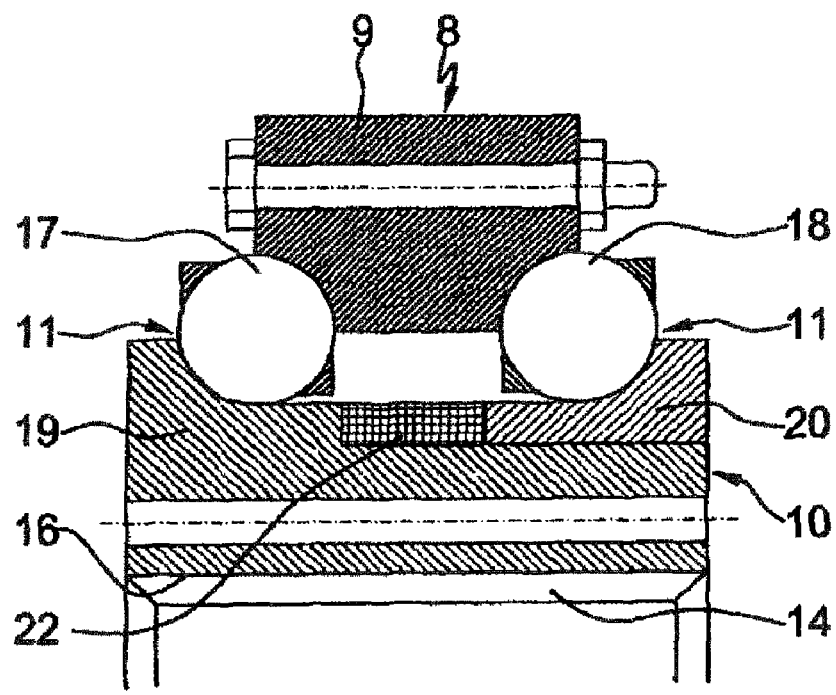
FIG. 6 shows a partial view of a cross section through a third embodiment of the large roller bearing of the rotor bearing according to the invention.
Figure 7:
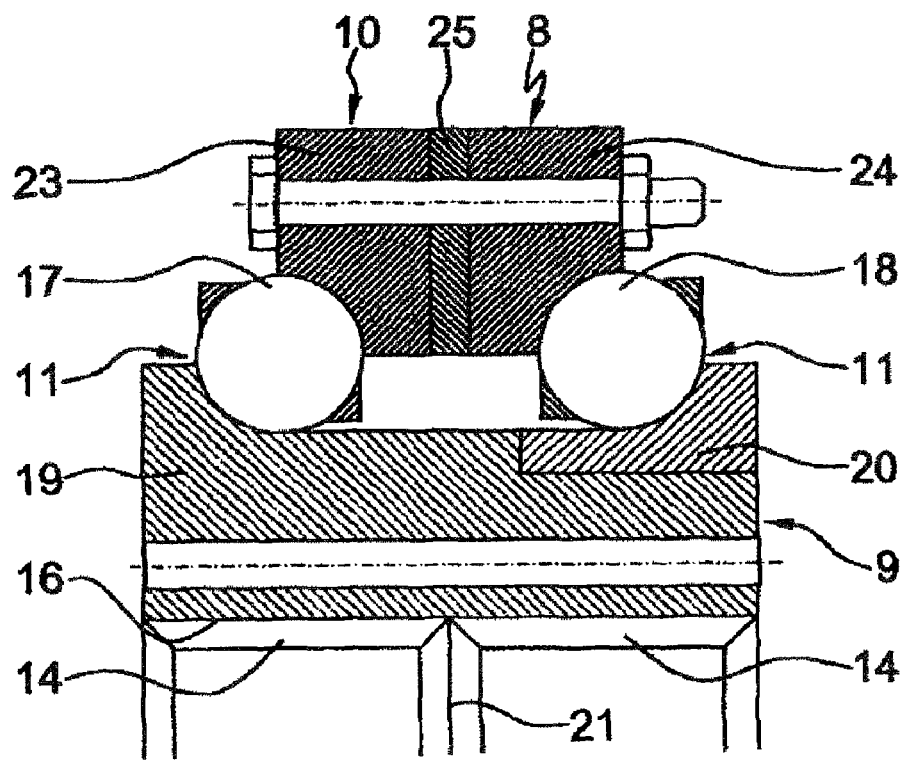
FIG. 7 shows a partial view of a cross section through a fourth embodiment of the large roller bearing of the rotor bearing according to the invention.

Furthermore, as can also be seen from the illustrations in FIGS. 2 and 3, the bearing ring 9 or 10, which in each case forms the inner ring of the large roller bearing 8, at the same time according to the invention forms the hollow wheel 13 of the epicyclic gearbox 12 which is connected to the generator 4, in that its inner face 16 is formed with the circumferential internal tooth system 14 of the hollow wheel 13. In this case, the large roller bearing 8 can either, as is illustrated in FIGS. 4 and 5, be in the form of a conical roller bearing having two rows 17, 18 of conical rollers arranged alongside one another as roller bodies 11 or, as illustrated in FIGS. 6 and 7, may be in the form of an inclined ball bearing which has two rows 17, 18 of bearing balls arranged alongside one another as roller bodies 11, wherein its inner bearing ring 9 or 10 which has the internal tooth system 14 is in each case subdivided axially asymmetrically into two ring elements 19, 20 in order primarily to ensure that the large roller bearing 8 can be assembled easily. As a result of the asymmetric subdivision, the inner bearing ring 9 or 10 then comprises a first ring element 19, which has the complete internal tooth system 14 on its inner face 16, and a second ring element 20, which is mounted on this ring element 19 by a push fit and completely forms one of the two raceways for the roller bodies 11 of the large roller bearing 8.

Furthermore, as is at least indicated in FIGS. 2 and 3, the internal tooth system 14 on the inner face 16 of the first ring element 19 of the inner bearing ring 9 or 10 is either, as in FIG. 2, in the form of a continuous inclined tooth system or, as in FIG. 3, is in the form of a double-inclined tooth system or arrow tooth system, which each run toward one another in an axially central separating groove 21. In this case, the inclined tooth system has an inclination angle so as to produce a high coverage level in the internal tooth system 14, considerably reducing the disturbing vibrations and noise during wind operation. In contrast, the double-inclined tooth system or arrow tooth system results in moving load action points, which result in a very uniform load distribution in the epicyclic gearbox 12, and likewise result in a considerable reduction in vibration and noise during wind operation, with the two-directional axial forces resulting from the tooth shape in opposite directions cancelling one another out, and thus ensuring optimum load transmission.

The enlarged illustrations of the large roller bearing 8 shown in FIGS. 4 and 6 finally also illustrate that a spacer ring 22 is preferably arranged with a determined defined width between the two ring elements 19, 20 of the inner bearing ring 9 or 10, in order to make it possible to adjust the axial play of the large roller bearing 8, which is designed as a two-row ball bearing or inclined ball bearing. In this case, as can be seen clearly, the spacer ring 22 has the same internal diameter as the second ring element 20 of the inner bearing ring 9 or 10, and is likewise pushed onto the first ring element 19 before the second ring element 20. However, as an alternative to this, it is also possible, as is shown in FIGS. 5 and 7, for the capability to adjust the axial play of the large roller bearing 8 to be provided by an axially symmetrical subdivision of the outer bearing ring 10 or 9 into two ring elements 23, 24, by arranging a spacer ring 25 with a determined defined width between these ring elements 23, 24. In this embodiment, it is particularly advantageous for the spacer ring 25 to have the same radial height as the ring elements 23, 24 between the ring elements 23, 24 of the outer bearing ring 10 or 9, although it is also possible to arrange the spacer ring 25 in a manner which is not illustrated in any more detail in an annular groove, which is incorporated in the axial surfaces of the two ring elements 23, 24 which rest on one another, such that the ring elements 23, 24 are at a short distance from one another and have an additional interlocking connection to one another.

LIST OF REFERENCE SYMBOLS

1 Wind energy installation
2 Machine tower

3 Machine housing
4 Generator
5 Rotor
6 Rotor blades
7 Rotor hub
8 Large roller bearing
9 First bearing ring of 8
10 Second bearing ring of 8
11 Roller bodies of 8
12 Epicyclic gearbox
13 Hollow wheel of 12
14 Internal tooth system of 13
15 Planet support of 12
16 Inner face of 9 or 10
17 First row of 11
18 Second row of 11
19 Ring element of 9 or 10
20 Ring element of 9 or 10
21 Separating groove
22 Spacer ring between 19, 20
23 Ring element of 10 or 9
24 Ring element of 10 or 9
25 Spacer ring between 23, 24

The invention claimed is:

1. A rotor bearing for a wind energy installation, comprising:
   a machine housing, which is mounted on a machine tower such that the machine housing can rotate;
   a generator for electricity production arranged in the housing;
   a wind-driven rotor with a rotor hub to which at least two rotor blades are fitted; and
   a large roller bearing, which supports the rotor and which has a first bearing ring, which is attached in a rotationally fixed manner to the machine housing and is arranged coaxially with respect to the rotor hub, a second hearing ring, which is held on the first bearing ring such that the second bearing ring can rotate and is attached to the rotor hub, and a multiplicity of roller bodies which roll between the first bearing ring and the second bearing ring, and the bearing being connected to a downstream epicyclic gearbox, which is connected to the generator and comprises a hollow wheel with a circumferential internal tooth system, a plurality of planet wheels mounted on planet supports, and a central sun wheel,
   wherein the radially inner of the two bearing rings of the large roller bearing at the same time forms the hollow wheel of the epicyclic gearbox which is connected to the generator, in that its inner face is formed with the circumferential internal tooth system of the hollow wheel.

2. The rotor bearing of claim 1, wherein the large roller bearing is a conical roller bearing having two rows which are arranged alongside one another and have conical rollers as roller bodies, the inner bearing ring of which, which has the internal tooth system, is separated axially asymmetrically into two ring elements.

3. The rotor bearing of claim 1, wherein the large roller bearing is formed from an inclined ball bearing having two rows which are arranged alongside one another and have bearing balls as roller bodies, the inner bearing ring of which, which has the internal tooth system, is separated axially asymmetrically into two ring elements.

4. The rotor bearing of claim 2, wherein, as a result of the asymmetric subdivision, the inner bearing ring comprises a first ring element, which has the complete internal tooth system on an inner face, and a second ring element, which is mounted on the first ring element by a push fit.

5. The rotor bearing of claim 4, wherein the internal tooth system on the inner face of the first ring element of the inner bearing ring is optionally a continuous straight or inclined tooth system, or a double-inclined or arrow tooth system, in each case running parallel to one another in an axially central separating groove.

6. The rotor bearing of claim 5, wherein a spacer ring, which is pushed onto the first ring element before the second ring element, is arranged with a determined defined width between the first ring element and the second ring element of the inner bearing ring, allowing for adjustability of axial play of the large roller bearing.

7. The rotor bearing of claim 5, wherein the outer bearing ring is separated axially symmetrically into two ring elements in order to allow axial play of the large roller bearing to be adjusted, and between the ring elements a spacer ring is arranged, which is of a same radial height as the ring elements and has a determined defined width.

8. The rotor bearing of claim 3, wherein, as a result of asymmetric subdivision, the inner bearing ring comprises a first ring element, which has the complete internal tooth system on an inner face, and a second ring element, which is mounted on the first ring element by a push fit.

9. The rotor bearing of claim 8, wherein the internal tooth system on the inner face of the first ring element of the inner bearing ring is optionally a continuous straight or inclined tooth system, or a double-inclined or arrow tooth system, in each case running parallel to one another in an axially central separating groove.

10. The rotor bearing of claim 9, wherein a spacer ring, which is pushed onto the first ring element before the second ring element, is arranged with a determined defined width between the first ring element and the second ring element of the inner bearing ring, allowing for adjustability of axial play of the large roller bearing.

11. The rotor bearing of claim 9, wherein the outer bearing ring is separated axially symmetrically into two ring elements in order to allow axial play of the large roller bearing to be adjusted, and between the ring elements a spacer ring is arranged, which is of a same radial height as the ring elements and has a determined defined width.

* * * * *